March 14, 1967     K. M. KOSANKE ETAL     3,309,162
ELECTRO-OPTICAL HIGH SPEED ADJUSTABLE FOCUSING ZONE PLATE
Filed June 28, 1963     2 Sheets-Sheet 1

INVENTORS
KURT M. KOSANKE
WERNER W. KULCKE
BY
*Maurice Kleitman*
ATTORNEY

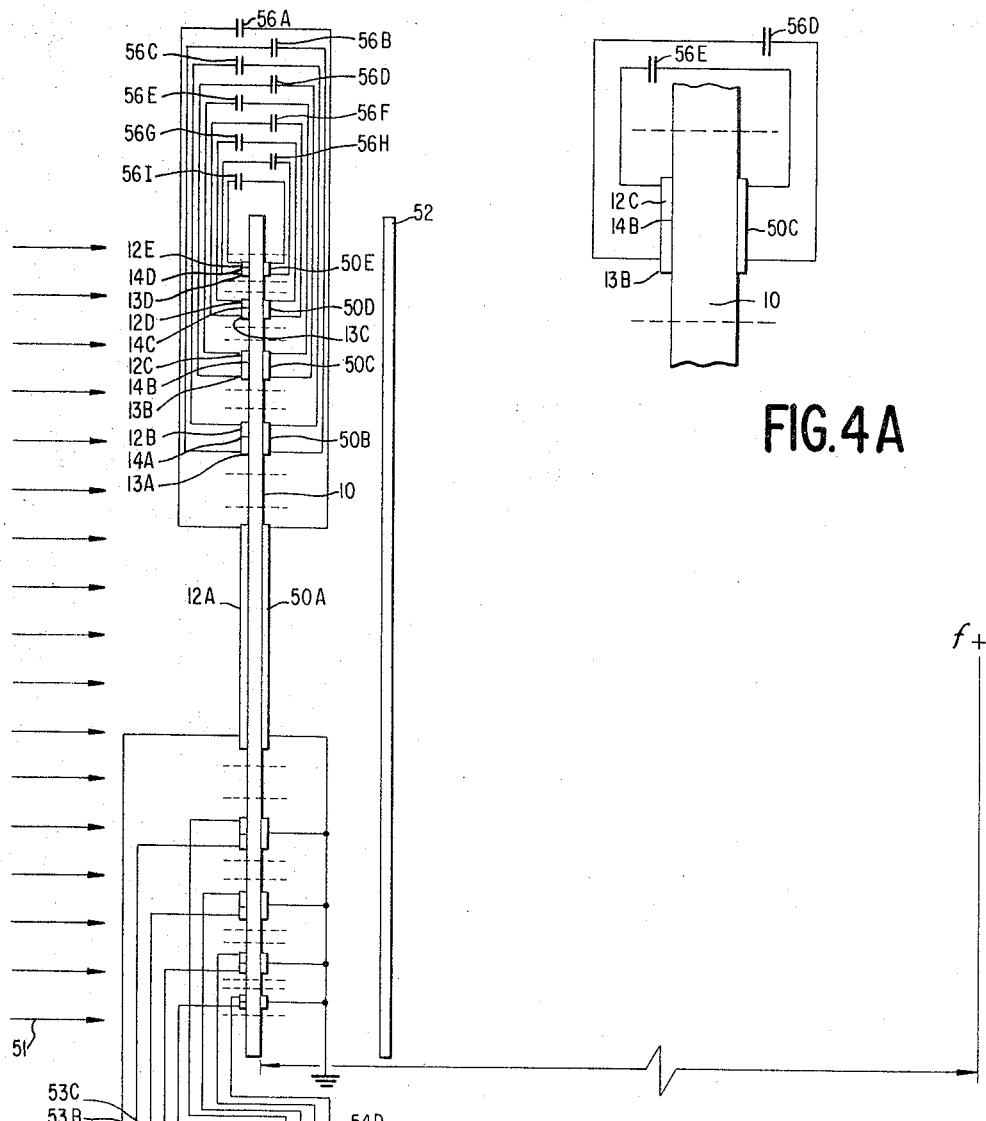
FIG. 4
FIG. 4A
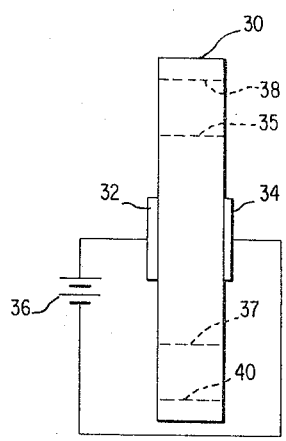
FIG. 3

United States Patent Office 3,309,162
Patented Mar. 14, 1967

3,309,162
ELECTRO-OPTICAL HIGH SPEED ADJUSTABLE FOCUSING ZONE PLATE
Kurt M. Kosanke and Werner W. Kulcke, Wappingers Falls, N.Y., assignors to International Business Machines Corporation, New York, N.Y., a corporation of New York
Filed June 28, 1963, Ser. No. 291,393
14 Claims. (Cl. 350—160)

This invention is related to the controlling and the directing of electromagnetic radiation. In particular this invention is related to the focusing of electromagnetic radiation of high frequency to selectable points at high speed.

Light and other high frequency electromagnetic radiation has many useful and beneficial properties which can be employed to great advantage. One of the beneficial properties of this type of radiation is the speed of travel, which is the greatest signal speed known in nature. High frequency electromagnetic radiation can be generated quickly, inexpensively, and conveniently. It can be detected with structurally simple equipment. High frequency electromagnetic radiation, unlike lower frequency electromagnetic radiation, does not diffract around large objects. High frequency electromagnetic radiation therefore can be transferred with a minimum of losses in the transmission path and with a minimum of interference to nearby equipment.

In the utilization of light and other high frequency electromagnetic radiation it is often necessary to focus such radiation to a point. Furthermore, it is often necessary to selectively focus such radiation to different points and to selectively focus with a minimum of time delay. It is therefore desirable that a high speed adjustable device be provided which could be useful in any application. The prior art does not include satisfactory techniques to change a point of focus quickly in accordance with changing requirements of a particular optical system. In the prior art, selective focusing of high frequency electromagnetic radiation is generally obtained by the mechanical moving of parts in the focusing system. Mechanical adjustment of this kind is slow. High speed, electrical radiation gates are known, but focusing to different points with such gates generally cannot be accomplished. The prior art does not contain a satisfactory system to obtain the variable focusing of mechanical devices by use of high speed, electrical means.

It is a general object of this invention to improve significantly over such mechanical focusing systems by providing a lens which can be focused at great speed by merely changing electrical potentials, to obtain high speed focusing well beyond the capabilities of any mechanical system.

It is a particular object of this invention to provide a lens which can adjust the point of focus in an optical display or memory input system in which the beam is moved laterally across a photosensitive strip to trace a line of print and the point of focus is adjusted continually with reference to the direction of the beam.

It is a further object of this invention to provide a lens which can be focused to different points with greatly improved speed.

It is a still further object of this invention to provide an adjustable lens which can be adjusted continuously at higher speed.

It is another object of this invention to create an electronically adjustable lens.

It is a more specific object of this invention to create a lens which can be focused with greater speed and which utilizes no moving parts.

In accordance with the broad aspects of the invention, an electrically adjustable lens is provided by locating pairs of electrodes on opposite surfaces of a substance which exhibits an electro-optic effect at areas laterally displaced from the electrodes when an electric field is impressed (stated differently, the substance exhibits a birefringent electro-optic effect), in which the pairs of opposite electrodes are located in a pattern which is symmetrical around a center point. Each pair of opposing electrodes being connected to an adjustable source of potential to thus complete an electrical circuit across the lens substance so that by proper selection of potential across each electrode pair, a bierfringent electro-optic effect occurs at a lateral distance dependent upon the potential across each pair of opposing electrodes at locations which define a Fresnel zone plate, to thereby diffract light to a point. By directing monochromatic, collimated electromagnetic radiation of high frequency perpendicular to the zone plate, the status of polarization of the radiation passing through those locations at which the birefringent electro-optic effect is induced is changed, so that Fresnel focusing will occur because the emerging radiation has polarity components which are orthogonal and, therefore, do not interfere with the unchanged radiation. The positions of the birefringent electro-optic effect locations are obtained by adjusting at great speed the potentials across the electrode pairs so that by proper selection of the potentials in accordance with the principles of the Fresnel zone plate the positions of the point of focus of the lens are varied.

In accordance with a somewhat more limited aspect of the invention electrode pairs are provided which are designed in a particular way to facilitate the proper location of the birefringent effect areas. Since there is a design problem because an increase in potential across an electrode pair in the basic structure of this invention causes each birefringent effect location to spread out from the electrode, and a decrease causes each birefringent effect location to contract toward the electrode, but because to change a first Fresnel zone plate to a second Fresnel zone plate of different focal length, all of the rings must be shifted the same direction, only one side of each electrode is active in the optical system. In the preferred embodiment at least one of the rings of each electrode pair is made up of two electrodes insulated from each other. When the potential on the inside electrodes is changed in one direction, the potential of the outside one is changed in the opposite direction. In this way the two optically active birefringent locations move in the same direction.

The foregoing and other objects, features, and advantages of the invention will be apparent from the following more particular description of the preferred embodiment of the invention, as illustrated in the accompanying drawings.

FIG. 3 is illustrative of the birefringent effect and is included for the purpose of more clearly showing the invention.

FIG. 4 shows a cross section through the lens at its center thus illustrating both the structure of the lens and the manner in which light is focused to differing points; FIG. 4 also shows the entire optical system in greater detail. FIG. 4A is an enlarged fragmentary view of the plate.

Figure 5:
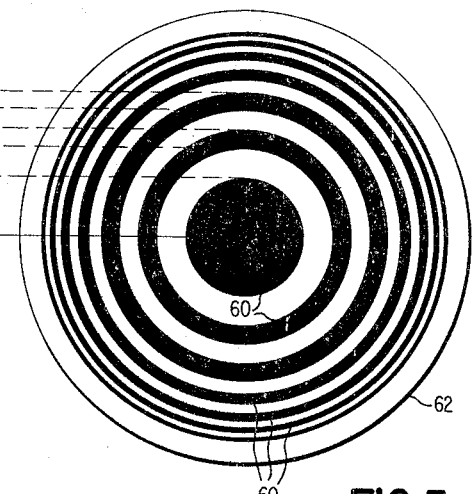

FIG. 5 is a Fresnel zone plate of the conventional type, included to make clear the general configuration which the invention creates and varies electrically.

Figure 1:
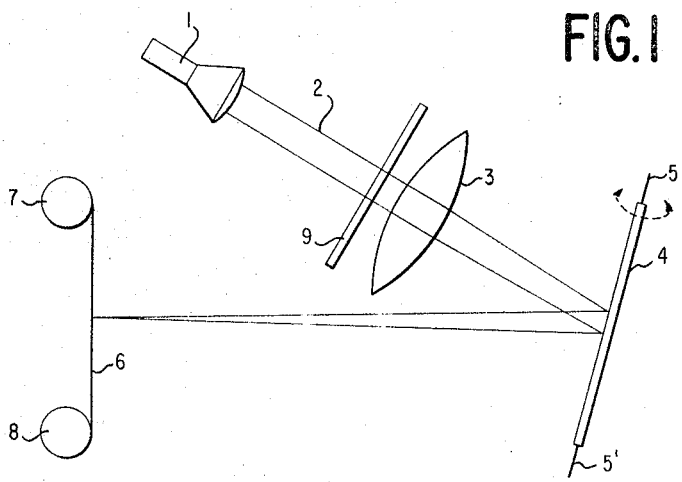
FIG. 1 is a system diagram to illustrate the invention employed in a data processing application.

FIG. 1 shows the invention used in a data processing application. The basic system is the known recording technique for rapid writing of digital information on a thermoplastic medium. In such a system a light is either off or on in the accordance with whether the digital information is a binary one or a binary zero. A light beam source 1, shown in FIG. 1, provides a collimated, monochromatic beam 2. A stationary, conventional lens 3 is provided to concentrate the beam 2. A mirror 4 is positioned so as to direct the beam 2. The mirror 4 turns on an axis defined by shafts 5 and 5′ to cause the beam 2 to scan laterally so that a line of data can be traced at the horizontal line of focus. Recording is accomplished upon the entire area of a thermoplastic web 6, which is moved past the line of focus by reels 7 and 8.

The adjustable lens 9 of this invention provides a high speed, electrically responsive focus adjusting device to cause focusing to be proper at every lateral point on the web 6. Without the adjustment of the lens 9, the scan caused by the pivoting mirror 3 would result in the point of focus caused by lens 3 tracing an arc, only one location of which would be situated on the web 6. In the system of FIG. 1 the adjusting lens 9 is linked electrically to the mirror 4 and the focus adjusts automatically and at high speed to the lateral displacement which the mirror 4 initiates.

Figure 2:
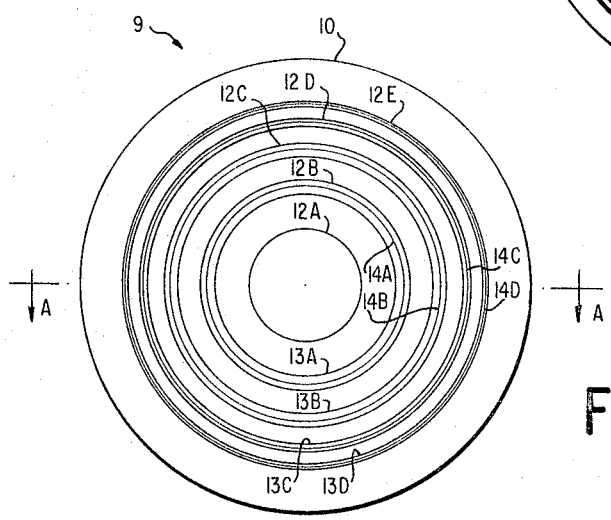
FIG. 2 shows the lens structure of the invention as it is viewed from the source of light.

Reference is made to FIG. 2, which illustrates in more detail the high speed adjustable lens of the type used in FIG. 1. FIG. 2 shows the structure of electrodes used to impress an electric field at the desired positions and to thereby accomplish focusing. The flat plate 10 is provided upon which the electrodes 12A–12E and 13A–13D are affixed. The plate 10 is composed of potassium dihydrogen phosphate (KDP, formula $KH_2PO_4$). This plate 10 is about one millimeter thick and has a surface area at least coextensive with the area of the lens used in practicing this invention. Although KDP is used in the specific embodiment, it will be understood that any substance capable of exhibiting the birefringent electro-optic effect is satisfactory for use in this invention. In particular ADP ($NH_4H_2PO_4$) and cuprous chloride (CuCl) are also well known electro-optic substances which exhibit the birefringent effect. Furthermore, potassium dideuterium phosphate ($KD_2PO_4$) has very good electro-optic properties, but is not used in the preferred embodiment because it is expensive. The result desired in this invention is the change in the status of polarization at points including the fringe of an electric field induced across the substance. Any material that can be induced to change the status of polarization of light passing through it at the fringe of an electric field (birefringent effect) may be used with this invention. When the electro-optic substance is a solid, the birefringent effect produced has been called the birefringent Pockels effect, a definition which requires the substance to be a piezoelectric crystal. It will be understood that even though the substance used in the preferred embodiment exhibits the birefringent Pockels effect, this invention could include other substances, even though the substance is not piezoelectric or crystalline.

Before proceeding with the discussion of the electrical structure associated with the invention, the birefringent effect will be discussed in detail so that the purpose and relative dimensions of the structure can be clearly understood. Reference is made to FIG. 3. FIG. 3 shows an arrangement of elements basically similar to one of the electrode rings used in the invention, but omitting some structure of the invention so as to more particularly explain the birefringent effect. The structure of the invention will be hereinafter more fully explained with reference to FIG. 4. The electro-optic substance 30, which represents the KDP of the preferred embodiment, is situated between two electrodes 32 and 34. A potential is induced across the substance 30 by the potential source 36. With a potential across the electrodes 32 and 34, electro-optic properties are observed in the substance directly between the electrodes 32 and 34 and these properties are also exhibited throughout the substance to laterally displaced points indicated by dotted lines 38 and 40. The area between the dotted lines 38 and 40 includes all of the area of birefringent effect. With a lesser potential impressed across the substance 30, the birefringent area decreases and exists between the dotted lines 35 and 37. The width of the birefringent effect is relatively constant in a given system (0.5 mm. in the system of the preferred embodiment). It has been observed that with change in potential at 36 the lateral displacement of the birefringent effect area increases with increased electric field across the electro-optic substance and decreases with decreases in electric field. Any substance which exhibits the birefringent effect will change the status of polarization of electromagnetic radiation passing through it.

Reference is made once again to FIG. 2, which shows the structural arrangement of the plate 10 and its electrodes 12A–12E and 13A–13D, the function of which should be more readily understood in view of the above discussion concerning the birefringent effect. The first ring shown in FIG. 2 is made up of two evaporated layers of conducting material 12B and 13A separated by an insulator 14A. The other bands are similarly constructed as shown by the rings 12C–12E and 13B–13D, separated by insulators 14B–14D. The center, circular electrode 12A is separated from other electrodes. Each of the electrodes 12A–12E and 13A–13D is connected to appropriate circuitry, which is illustrated in FIG. 4.

A more detailed view of the entire system is shown in FIG. 4, which also includes other parts of the invention of the preferred embodiment to illustrate the entire functioning of the adjustable Fresnel zone plate of this invention. FIG. 4 shows the KDP plate 10, the outside electrodes 12A, 12B, 12C, 12D, and 12E; the inside electrodes 13A, 13B, 13C, and 13D; and insulation 14A, 14B, 14C, and 14D. Also shown is the back of the KDP plate 10, illustrating that each electrode ring on the front is matched by electrodes 50A, 50B, 50C, 50D, and 50E, each of which is of equal width with the electrode pair 12A–12E and 13A–13D which it faces. The electrodes 50A–50E are all connected to ground. Parallel, polarized beams of monochromatic light 51 (which would be the data carrying light 1 of FIG. 1) are shown impinging perpendicularly upon the lens. An analyzer 52 is situated beyond the lens as viewed from the source of light 51. The analyzer 52 is of the conventional type which passes light of one polarization and rejects light of other polarization.

In order to adjust the potential selectively across the plate 10 to create the desired birefringent locations, so as to obtain the correct focus each outside electrode 12A, 12B, 12C, 12D, and 12E is connected to a variable potential of $V_1$ through a capacitor 53A, 53B, 53C, 53D, and 53E, each connected to its individual electrode. In the same manner inside electrodes 13A, 13B, 13C, and 13D, are connected to variable potential $V_2$ through capacitors 54A, 54B, 54C, and 54D, each connected to its individual electrode. Each of the capacitors 53A, 53B, 53C, 53D, 53E, 54A, 54B, 54C, and 54D, are of different value. The choice of the magnitude of the capacitors depends upon the capacities across the plate 10 and the magnitude of the variable voltages $V_1$ and $V_2$ used. To simplify design by rendering the capacity of the electrodes across the plate 10 negligible capacitors 56A–56I are inserted across the plate 10, each electrically in parallel with a pair of electrodes across the plate 10. Each capacitor 56A–56I has a value of $100 \times 10^{-12}$ farads. The capacitors 56A–56I are connected by small conductors and are not located in the optical path.

The proper selection of magnitudes of the potentials, capacitors, and other electrical elements is dictated by the theory of operation which is as follows: The voltage $V_1$ appears across the plate 10 at the several electrodes 12A–12E reduced by the potential drop across the capacitors 53A–53E. In the same manner the voltage $V_2$ appears across the plate 1 at the several electrodes 13A–13D reduced by the potential drop across the capacitors 54A–54D. Since the magnitude of each capacitor is different from the others, it is manifest that different voltages appear across each ring defined by the electrodes 12A–12E and 13A–13D. Since the plate 10 is an electro-optic substance in which a birefringent effect will occur, birefringent locations which will change the status of polarization of electromagnetic radiation appear displaced from the electrodes in accordance with the magnitude of the potential across the electrodes. At locations other than the birefringent points, the status of polarization of impinging radiation is not changed.

The specific details of design of the preferred embodiment, are also dictated by the width of the birefringent effect rings required to define a Fresnel zone plate. The following discussion of Fresnel zone plate focusing is included because of the analogy between a conventional Fresnel zone plate and the zone plate created electrically by the invention.

Reference is made to FIG. 5 which shows, for purposes of discussion a conventional Fresnel zone plate. Fresnel zone plate interaction is obtained by passing radiation which will interfere in accordance with a pattern which results in an additive effect at the point of focus. FIG. 5 shows a conventional plate of this kind for purposes of discussion, in which the radiation to be excluded from interference is blocked by opaque rings.

The opaque rings 60, which are analogous to the rings defined by the birefringent effect in the invention, define a mask to pass only that radiation which will diffract in the desired manner. The opaque rings 60 are mounted on a transparent plate 62, which is analogous to the plate 10. FIG. 5 shows, for purposes of illustration, the shortest five radii of the zone plate, illustrated figuratively by the use of dashed lines, so that the manner of defining the radii will be made perfectly clear. Of course, remaining radii are numbered in accordance with the same scheme, and it will be understood that the shortest five radii were chosen only as being the most convenient for the purposes of illustration. Since the distance to the point of focus from each radius increases one-half wave length in the zone plate shown, the formula $r_n = \sqrt{nf\lambda}$ describes the dimensions of the system for purposes of calculation, where $r_n$ is the radius of the $n$th zone, $f$ is the distance from the focal point to the zone plate surface, and $\lambda$ is the wave length of the light to be focused: Focal length, of course, increases with an increase in radii magnitude. The following table describes focusing at 500 mm., and with wave length of 5561 angstroms.

TABLE I

| Ring: | Radius (mm.) |
|---|---|
| $r_1$ | 0.522 |
| $r_2$ | 0.736 |
| $r_3$ | 0.905 |
| $r_4$ | 1.042 |
| $r_5$ | 1.168 |
| $r_6$ | 1.280 |
| $r_7$ | 1.380 |
| $r_8$ | 1.476 |
| $r_9$ | 1.566 |
| $r_{10}$ | 1.650 |

In the preferred embodiment it is desired to change the focus with reasonable accuracy from the 500 mm. point to between plus 25.0 mm. and minus 25.0 mm. Table II shows the change in radius which would accomplish this.

TABLE II

| Ring: | Change of focal length $\Delta r$ 475.0 and 525.0 mm. |
|---|---|
| $r_1$ | 0.0270 |
| $r_2$ | 0.0384 |
| $r_3$ | 0.0470 |
| $r_4$ | 0.0542 |
| $r_5$ | 0.0606 |
| $r_6$ | 0.0664 |
| $r_7$ | 0.0718 |
| $r_8$ | 0.0766 |
| $r_9$ | 0.0808 |
| $r_{10}$ | 0.0858 |

Table III shows the point of focus for different wave lengths when the rings are as shown in Table I.

TABLE III

| $\lambda$ (angstroms): | $f$ |
|---|---|
| 4000 | mm. 681 |
| 6000 | mm. 454 |

The details of design of the preferred embodiment of the invention, in which light of 5561 angstroms is focused, are controlled by the relationships established by Tables I and II. Since the birefringent effects occur relatively close to the electrodes 12A–12E and 13A–13D, on the plate 10, the electrodes 12A–12E and 13A–13D are wide near the center of the lens where in accordance with Table I, the rings are widely separated. Since each electrode pair 12A–12E and 13A–13D will create a birefringent area on each side, the basic configuration of FIG. 5 is obtained by defining a Fresnel zone plate by the gaps between birefringent effect areas as they extend from the electrodes. An electrode ring is situated where every opaque ring is found in FIG. 5 but is somewhat smaller in size. Design of the preferred embodiment is completed by choosing the capacitors 53A–53E and 54A–54D with reference to the potentials $V_2$ and $V_1$ and also with reference to the amount of displacement of the birefringent effect desired in accordance with the positions of the electrodes. Table II makes it clear that the outer rings must vary a greater amount than the inner rings. The outer ring capacitors 53A–53E therefore must be large relative to the capacitors connected to the inner rings, since the potential which will appear across the plate 10 increases with the capacity of its associated capacitors 53A–53E and 54A–54D. By proper selection of the capacitors the preferred embodiment of FIG. 4 was designed so that $r_1$ varies 0.027 mm. and passes through 0.522 mm. while $r_2$ varies 0.0384 mm. and is 0.736 when $r_1$ is at 0.522 mm. In the same manner the other radii change in accordance with Tables I and II. FIG. 4 shows dashed lines to indicate the areas at which a birefringent effect is induced for one, illustrative focusing pattern.

Although each electrode 12A–12E and 13A–13D could be controlled by a separate source of potential, it is a further feature of the preferred embodiment that a minimum of potential sources are used, namely $V_1$ and $V_2$ of FIG. 4. This limits the changes to each of the associated electrodes to ones which are directly proportional since any change in $V_1$ appears in some proportion dictated by the capacitors 53A–53E across each of the electrodes 12A–12E. The same is true with changes in $V_2$. However, variations from the theoretically desired relationships dictated by Table II are negligible, and the feature of reducing potential sources is a useful one.

In the preferred embodiment the capacity of each electrode is:

TABLE IV

| Electrode: | Capacity, f. |
|---|---|
| 1 (12A) | $0.144 \times 10^{-12}$ |
| 2 (13A) | $0.055 \times 10^{-12}$ |
| 3 (12B) | $0.060 \times 10^{-12}$ |
| 4 (13B) | $0.042 \times 10^{-12}$ |
| 5 (12C) | $0.043 \times 10^{-12}$ |
| 6 (13C) | $0.023 \times 10^{-12}$ |
| 7 (12D) | $0.023 \times 10^{-12}$ |
| 8 (13D) | $0.0093 \times 10^{-12}$ |
| 9 (12E) | $0.0093 \times 10^{-12}$ |

These are rendered negligible by the by-pass capacitors 56A–56I, which are all $100 \times 10^{-12}$ farads in magnitude.

The change in radii with respect to other radii is given by Table II. It is known that an 0.1 mm. displacement of the birefringent effect in the structure of the preferred embodiment is obtained with a potential change of 1500 volts. As Table II shows, a 0.1 mm. shift is sufficient for all requirements. A potential of 1500 volts is obtained by selecting 2250 volts for $V_1$ and $V_2$. Some drop appears across the capacitors 56A–56I and the $200 \times 10^{-12}$ farad capacitor in the outer ring compensates for this drop in ring 10.

With these selections made, the other capacitors are dictated by the proportional change which must occur in accordance with Table II with a given change in $r_{10}$. Table V shows this computation and the final values obtained.

TABLE V

| Ring | Capacitor | $\frac{\Delta r_n}{\Delta r_{10}}$ | Magnitude, f. |
|---|---|---|---|
| 1 | 53A | 0.31468 | $26 \times 10^{-12}$ |
| 2 | 54A | 0.44755 | $42.5 \times 10^{-12}$ |
| 3 | 53B | 0.54778 | $57.5 \times 10^{-12}$ |
| 4 | 54B | 0.63170 | $72.7 \times 10^{-12}$ |
| 5 | 53C | 0.70629 | $81.9 \times 10^{-12}$ |
| 6 | 54C | 0.77389 | $106.5 \times 10^{-12}$ |
| 7 | 53D | 0.83682 | $126.2 \times 10^{-12}$ |
| 8 | 54D | 0.89277 | $147.0 \times 10^{-12}$ |
| 9 | 53E | 0.94382 | $169.5 \times 10^{-12}$ |
| 10 | (Not shown) | 1.0 | $200 \times 10^{-12}$ |

Focusing occurs as a result of the orthogonal polarization of light transmitted and the fact that the pattern of the polarized light is in a Fresnel zone plate configuration. The light 51 is, of course, so oriented with respect to the plate 10 that a change in the status of polarization of light emerging from birefringent effect areas occurs. This light thus emerges with a component of polarization orthogonal to the other emerging light. Since orthogonal light does not interfere, the light emerging from the gaps between birefringent areas has components which will diffract in accordance with its pattern. The Fresnel zone plate pattern results in diffraction to the point of focus $f$. The electrodes 12A–12E and 13A–13D are opaque in the preferred embodiment to give improved exclusion of light at those areas at which exclusion is desired. Focusing, however, occurs because the radiation is formed into a pattern of orthogonal radiation. The analyzer 52 passes the focused radiation and excludes radiation of a polarization which is not being focused to insure the exclusion of the small amounts of light which might reach the focus location from those points not in a focusing pattern. Adjusting the potential sources $V_1$ and $V_2$ creates, at high speed and with no substantial movement of mechanical parts, a different point of focus.

The suitability of the invention lens 9 in the data processing system of FIG. 1 should now be completely evident. The variable potential into the lens 9 is controlled directly by the positions of the shafts 5 and 5'. Focusing adjustment of the light beam 2 is automatic and takes place almost instantly in direct relationship to the angle of the mirror 4. Although the arrangement of FIG. 1 is shown in a specific way, it was done for purposes of illustrating the invention and it will be recognized that the lens 9 could be responsive to other inputs or parameters than that described and shown, such as utilizing the signal for driving the shafts, 5 and 5', of the mirror 4 directly to control the lens 9.

While the invention has been particularly shown and described with reference to a preferred embodiment thereof, it will be understood by those skilled in the art that the foregoing and other changes in form and details may be made therein without departing from the spirit and scope of the invention.

We claim:
1. An adjustable focusing system comprising:
   a source of collimated, high frequency electromagnetic radiation,
   an electro-optic substance which will exhibit a birefringent electro-optic effect at points displaced from the center of an electric field a distance proportional to the magnitude of the electric field,
   electric potential means to impress an electric field in a pattern across said electro-optic substance at such locations and of such magnitude that birefringent effects occur which define a first Fresnel zone plate to said radiation,
   and means to vary said electric field pattern so that the birefringent effects define a second Fresnel zone plate to said radiation which causes focusing at a point different from said first Fresnel zone plate.

2. The device according to claim 1 wherein said electric potential means include electrodes mounted on opposite sides of said electro-optic substance.

3. The device according to claim 2 wherein at least some of said electrodes are substantially contiguous and so spaced that only one of two possible birefringent effects of said contiguous electrodes appears in the optical system.

4. The device according to claim 3 wherein said source of radiation produces linearly polarized radiation of polarity different from that induced by said electri-optic substance and also comprising an analyzer located in the optical path beyond said electro-optic substance oriented to pass radiation of the polarity of said source of radiation.

5. The device according to claim 4 wherein said source of radiation produces radiation of wave length of 4000 angstroms to 6000 angstroms.

6. The device according to claim 2 wherein said source of radiation produces linearly polarized radiation of polarity different from that induced by said electro-optic substance and also comprising an analyzer located in the optical path beyond said electro-optic substance oriented to pass radiation of the polarity of said source of radiation.

7. The device according to claim 1 wherein said source of radiation produces radiation of wave length of 4000 angstroms to 6000 angstroms.

8. An adjustable lens system comprising:
   a source of collimated, high frequency electro-magnetic radiation,
   an electro-optic substance which will exhibit a birefringent electro-optic effect at laterally spaced points from an electric field when an electric field is impressed across said electro-optic substance, the locations of said laterally spaced points depending upon the magnitude of the electric field,
   electric potential means to create an electric field across said electro-optic substance at locations which cause birefringent effects to occur so spaced as to define a pattern to said radiation which will diffract the radiation substantially to a first point,
   and means to vary said electric field to cause birefringent effects to occur so spaced as to define a pattern which will diffract the radiation substantially to a second point so that adjustable focusing is obtained.

9. The device according to claim 8 wherein said electric potential means include conductive plates located on opposite sides and in contact with said electro-optic substance.

10. The device according to claim 9 wherein at least some of said conductive plates are substantially contiguous and so spaced that only one of the two possible birefringent effects of said contiguous electrodes appears in the optical system.

11. The device according to claim 10 wherein said source of radiation produces linearly polarized radiation of polarity different from that induced by said electro-optic substance and also comprising an analyzer located in the optical path beyond said electro-optic substance oriented to pass radiation of the polarity of said source of radiation.

12. The device according to claim 11 wherein said source of radiation produces radiation of wave length of 4000 angstroms to 6000 angstroms.

13. The device according to claim 9 wherein said source of radiation produces linearly polarized radiation of polarity different from that induced by said electro-optic substance and also comprising an analyzer located in the optical path beyond said electro-optic substance oriented to pass radiation of the polarity of said source of radiation.

14. The device according to claim 8 wherein said source of radiation produces radiation of wave length of 4000 angstroms to 6000 angstroms.

References Cited by the Examiner
UNITED STATES PATENTS

| | | | |
|---|---|---|---|
| 3,067,413 | 12/1962 | Fischle et al. | 88—61 X |
| 3,227,034 | 1/1966 | Shelton | 88—61 X |

JEWELL H. PEDERSEN, *Primary Examiner.*

JOHN K. CORBIN, *Examiner.*